(12) United States Patent
Chen et al.

(10) Patent No.: US 11,448,537 B2
(45) Date of Patent: Sep. 20, 2022

(54) ULTRASONIC FLOWMETER WITH VIBRATION-RESISTANT OPERATING MODE

(71) Applicant: Honeywell International Inc., Morris Plains, NJ (US)

(72) Inventors: Longfei Chen, Shanghai (CN); Bin Sai, The Hague (NL); MeiFa Chen, Shanghai (CN)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 179 days.

(21) Appl. No.: 17/025,877

(22) Filed: Sep. 18, 2020

(65) Prior Publication Data

US 2022/0090949 A1 Mar. 24, 2022

(51) Int. Cl.
*G01F 1/66* (2022.01)
*G01F 1/667* (2022.01)

(52) U.S. Cl.
CPC .................... *G01F 1/666* (2013.01)

(58) Field of Classification Search
None
See application file for complete search history.

(56) References Cited

U.S. PATENT DOCUMENTS

| | | | |
|---|---|---|---|
| 9,261,389 B2 * | 2/2016 | Gill | G01F 1/662 |
| 11,181,406 B2 * | 11/2021 | Loos | G01F 1/78 |
| 2019/0049277 A1 * | 2/2019 | Niwa | G01F 25/10 |
| 2020/0284694 A1 | 9/2020 | Scott et al. | |

FOREIGN PATENT DOCUMENTS

| | | | |
|---|---|---|---|
| CN | 202255497 U | * | 5/2012 |
| JP | 2018044954 A | * | 3/2018 |
| WO | 2005026668 A1 | | 3/2005 |

OTHER PUBLICATIONS

Extended European Search Report dated Feb. 3, 2022, issued in connection with corresponding EP Application No. 21195854.1 (8 pages total).

* cited by examiner

*Primary Examiner* — Curtis A Kuntz
*Assistant Examiner* — Jerold B Murphy
(74) *Attorney, Agent, or Firm* — John Maldjian; Stevens & Lee PC (57) ABSTRACT

An ultrasonic flowmeter (USM) includes a meter body including a pipe section for flowing a fluid therethrough including a first and second ultrasonic transducer, top-works including a housing and a PCB, a controller coupled to the ultrasonic transducers through a transmitter and/or receiver, and an accelerometer and/or an acoustic sensor for sensing a vibration on the pipe section and for providing an output signal coupled to the controller. The electronics are communicatively coupled to the meter body and the housing is mechanically coupled to the meter body. The controller analyzes the output signal to identify ≥1 vibration frequency and compares the vibration frequency to a predetermined sensitive frequency range for the USM. When the vibration frequency is determined to be within the predetermined frequency range, the controller implements an anti-vibration operating mode by increasing a measurement time when measuring the fluid flow and/or adding additional data processing task(s).

16 Claims, 7 Drawing Sheets

ULTRASONIC FLOWMETER WITH VIBRATION-RESISTANT OPERATING MODE

FIELD

Disclosed aspects relate to ultrasonic flow meters (USMs).

BACKGROUND

In a variety of industries that involve the flow of a product, it is needed to be able to accurately measure the amount of product that is flowing at any given time. There are several different types of known flowmeters. Such known flowmeters include mechanical flowmeters (e.g. a piston meter, Woltmann meter or a jet meter, which all measure fluid flow through some mechanical means), a vortex flowmeter (where vortices are generated by obstructing part of the fluid path, producing a voltage pulse, the frequency of which can be measured and hence flow can be determined), magnetic flowmeters (potential difference of a conducting fluid, as a result of an applied magnetic field, is measured and flow can be determined), turbine as well as rotary flowmeters. There are also static (meaning no moving parts) flowmeters including USMs.

USMs are becoming popular for fluid flow metering because of their capability to measure a wide range of different flow rates, cause only minimal pressure drops, and they also have no moving parts thus providing less mechanical maintenance and better reliability as compared to most conventional flowmeter types. A key hardware component in the USM is an ultrasonic transducer, also known as an ultrasonic sensor, that comprises at least a piezoelectric crystal or a piezoelectric ceramic, typically comprising Lead Zirconate Titanate (PZT). As known in physics the piezoelectric effect is the ability of certain materials to generate an electric charge responsive to an applied mechanical stress, as well as the reverse process. Although USMs can include a single ultrasonic transducer, USMs generally include at least one pair of ultrasonic transducers, which operate by converting electrical energy supplied in the form of a pulsed electrical drive signal delivered to the ultrasonic transducer which converts the electrical energy received into an ultrasonic signal that is transmitted and directed at the fluid being measured, and vice-versa when used as an ultrasonic receiver.

Such USMs may include an outer housing, and within the housing there may be a printed circuit board (PCB) that includes a controller, such as a microcontroller unit (MCU) or a digital signal processor(s), and generally other electronics. The USMs are generally either battery-powered and/or external line powered, and can include a radio frequency (RF) unit comprising a transmitter and receiver, and an antenna for wireless communications. The ultrasonic transducer pair includes a first and a second ultrasonic transducer. In one conventional ultrasonic transducer arrangement, the first and second transducers are configured on the same side of the pipeline to produce a V-shaped ultrasonic signal path using a single reflection off the pipeline after passing through the fluid to be measured. Another known ultrasonic transducer arrangement is a direct transit path type that does not involve any signal reflection. There is a plurality of other known transducer arrangements, and the number of transducers can total up to about 16 or even beyond depending on the pipe diameter and cost constraints.

One known USM arrangement comprises what is descriptively generally termed a top-works including a housing, a PCB having electronics including a processor such as an MCU, a battery pack, and a display, that is mechanically and electrically coupled to a meter body that comprises a piece of pipe having a first and at least a second ultrasonic transducer. The connection between the top-works' housing and the meter body includes wires for communication and a metal joint for the physical connection.

SUMMARY

This Summary is provided to introduce a brief selection of disclosed concepts in a simplified form that are further described below in the Detailed Description including the drawings provided. This Summary is not intended to limit the claimed subject matter's scope.

Disclosed aspects recognize a problem for USMs is that they are susceptible to interference caused by extraneous mechanical vibrations or noise at frequencies within its ultrasonic transducers' operating frequency range. This interference effect can reduce the USMs flow measurement accuracy. In application of USMs in the field, there is often a gas regulator and/or a valve such as a ball valve, globe valve, butterfly valve, or poppet valve, installed proximate to the USM. Gas regulators can create vibrations at frequencies typically less than a few hundred kilohertz (kHz), which when located proximate to a USM can be picked up by the USM's transducers that typically operate at 80 kHz to 300 kHz. It is recognized herein that such vibrations can add noise in the ultrasonic sensing signal, which results in a decrease in measurement accuracy for the USM, which can also cause problems including affecting financial transactions by causing the USM to provide significantly inaccurate measured gas volumes.

One disclosed aspect comprises a USM including a meter body including a pipe section configured to flow a fluid therethrough including a first and a second ultrasonic transducer, and top-works including a housing and a PCB comprising electronics including a controller coupled to the ultrasonic transducers through a transmitter and/or receiver. The PCB also includes an accelerometer and/or an acoustic sensor for sensing a vibration on the pipe section, and for providing an output signal that is coupled to the controller. The electronics are communicatively coupled to the meter body, and the housing that is mechanically coupled to the meter body by mechanical joint. The controller analyzes the signal from the accelerometer and/or an acoustic sensor to identify at least one vibration frequency, and compares the vibration frequency(ies) to a predetermined sensitive frequency range for the USM. When the vibration frequency is determined to be within the predetermined frequency range, the controller implements an anti-vibration operating mode by increasing a measurement and processing time when measuring a flow of the fluid and/or adding additional data processing task(s) to address the vibrations.

The accelerometer is generally in the form of a microelectromechanical system (MEMS) package having a plurality of leads or lead terminals to facilitate its mounting on a PCB, and the acoustic sensor is generally a high-frequency acoustic sensor, such as a high-frequency microphone which is also generally configured in a package configured to mount on a PCB. The accelerometer and acoustic sensor when both provided can sense extraneous vibrations from vibration source(s) over a range of frequencies that may be present when the vibration source(s) is positioned proximate to the USM. The controller generally runs algorithms in the form of firmware that monitor and suppress the vibration noise effects when needed by automatically switching into an anti-vibration operating mode to render the USMs measurement accuracy largely unaffected despite the presence of vibrations in a frequency range that would otherwise affect the accuracy and repeatability performance of the USM.

DETAILED DESCRIPTION

Disclosed aspects are described with reference to the attached figures, wherein like reference numerals are used throughout the figures to designate similar or equivalent elements. The figures are not drawn to scale and they are provided merely to illustrate certain disclosed aspects. Several disclosed aspects are described below with reference to example applications for illustration. It should be understood that numerous specific details, relationships, and methods are set forth to provide a full understanding of the disclosed aspects.

Figure 1:
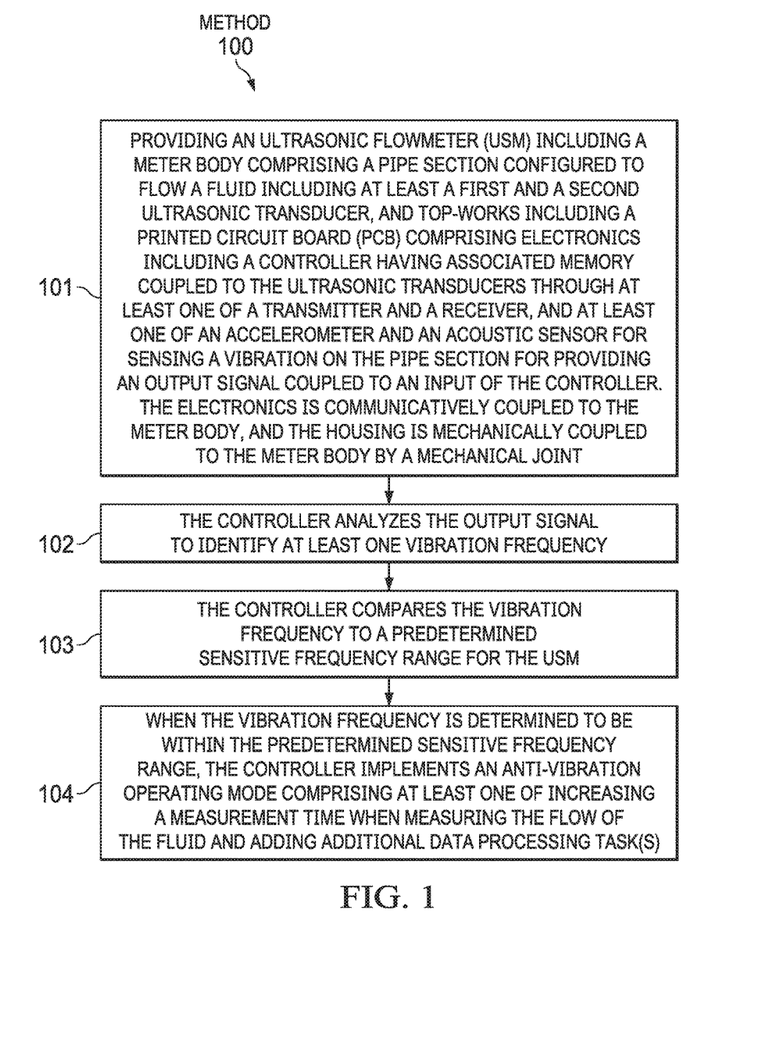
FIG. 1 is a flowchart showing steps for an example method of operating USM that implements an anti-vibration operating mode responsive to sensing vibrations within a predetermined sensitive frequency range of the USM.

FIG. 1 is a flowchart showing steps for an example method 100 of operating a USM to implement an anti-vibration (or vibration-resistant) operating mode responsive to sensing vibrations within a predetermined sensitive frequency range of the USM. The predetermined sensitive frequency range can be determined from a resonant frequency(ies) of the ultrasonic transducers. For example, the resonant frequency of the ultrasonic transducers can be determined by using at least one of a maximum phase and or/a minimum impedance of the sonic transducers. In one example, the predetermined sensitive frequency range is from 80 kHz to 300 kHz.

Step 101 comprises providing a USM including a meter body comprising a pipe section configured to flow a fluid including at least a first and a second ultrasonic transducer, and top-works including a PCB comprising electronics including a controller (e.g., MCU) having an associated memory coupled to the ultrasonic transducers through at least one of a transmitter and a receiver. There is at least one of an accelerometer and an acoustic sensor for sensing a vibration on the pipe section and for providing an output signal representative of the vibration that is coupled to an input of the controller. The PCB may also include a battery that generally comprises a battery pack, such as a lithium-ion battery pack. The fluid in the pipe can comprise a hydrocarbon gas such as natural gas or propane, or can also comprise hydrogen.

An advantage of the disclosed method is that the length of inlet pipe (e.g., the spool that is usually installed before the USM and after the regulator) is not limited to a minimum length that is usually required to separate USM from an external vibration source such as a gas regulator. The longer the inlet pipe, the larger the separation, the smaller the noise influence by the vibration source on the USM, but larger the space that is needed which is not commonly available in practical installations. In most USM installations, the vibration source(s) is commonly located proximate relative to the USM.

Regarding an accelerometer, when mounted on a vibrating structure, the accelerometer proportionally converts mechanical energy to electrical energy. Accelerometers generally are classified in one of two categories, producing either 10 mV/g or 100 mV/g, where g is the gravitational constant, and where 1 g=9.81 m/s$^2$. The frequency of the output voltage provided by an accelerometer will match the frequency of the vibrations. The output level of the signal from the accelerometer will be proportional to the amplitude of the vibrations.

The acoustic wave sensor can comprise a high frequency microphone or an ultrasonic sensor. An acoustic wave sensor is known to be an electronic device that can measure sound levels. The top-works may also include a display. The electronics on the PCB of the top-works are communicatively coupled to the meter body by wires, or by a wireless connection. The housing of the top-works is mechanically coupled to the meter body by a mechanical joint, generally being a metal joint. The controller is for implementing steps 102-104 described below.

Step 102 comprises analyzing the output signal to identify at least one vibration frequency. Step 103 comprises comparing the vibration frequency to a predetermined sensitive frequency range for the USM. Step 104 comprises when the vibration frequency is determined to be within the predetermined sensitive frequency range, implementing an anti-vibration operating mode comprising at least one of increasing a measurement time when measuring the flow of the fluid and adding additional data processing task(s).

Figure 2A:
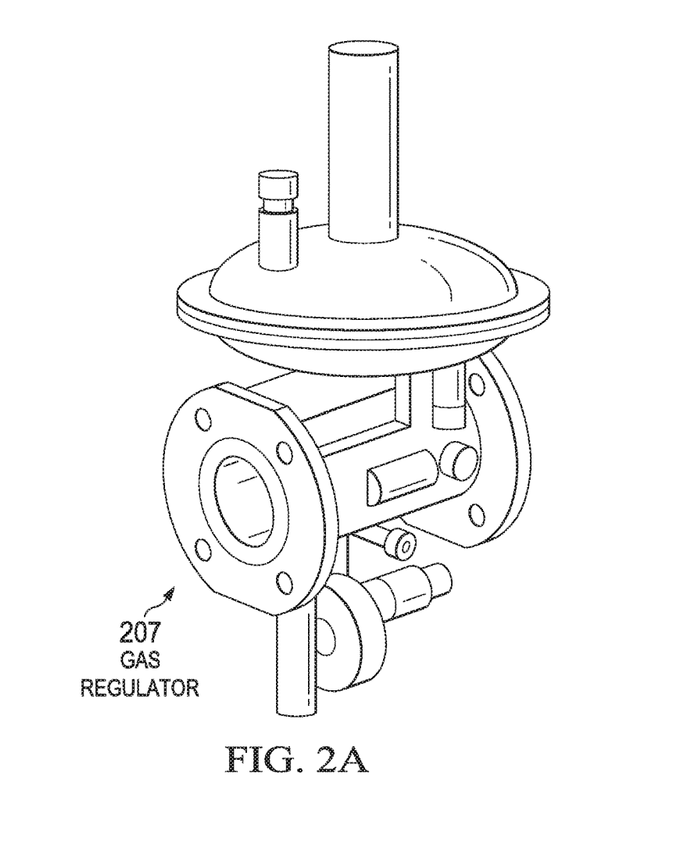
FIG. 2A depicts a vibration source shown by example as a gas regulator that when in proximity to a USM that is shown in FIG. 2B results in affecting the signal sensed by the ultrasonic transducers ($T_1$ and $T_2$) fixed on the meter body of the USM.
Figure 2B:
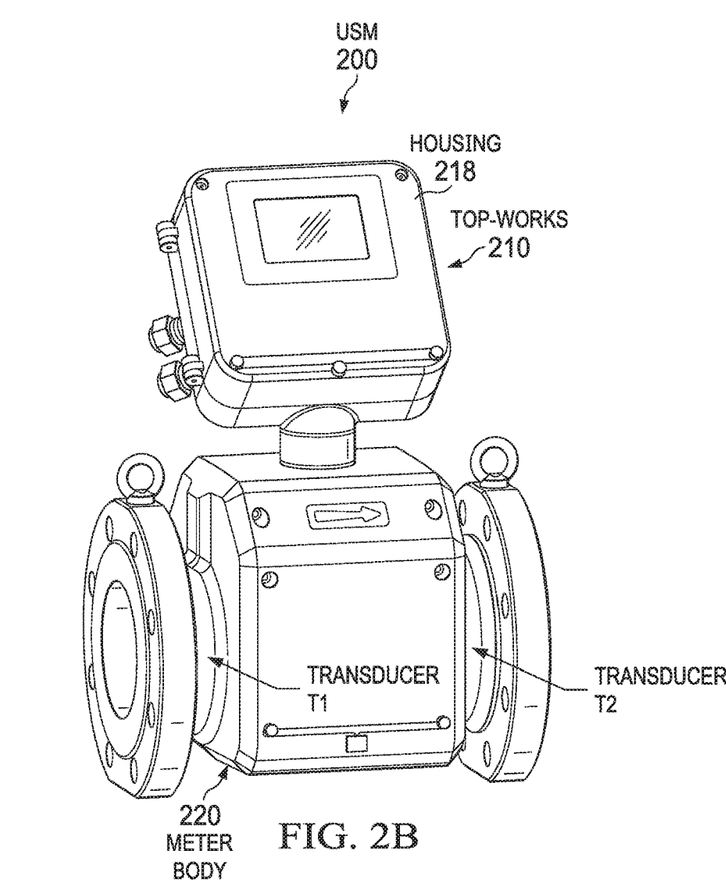
Figure 2C:
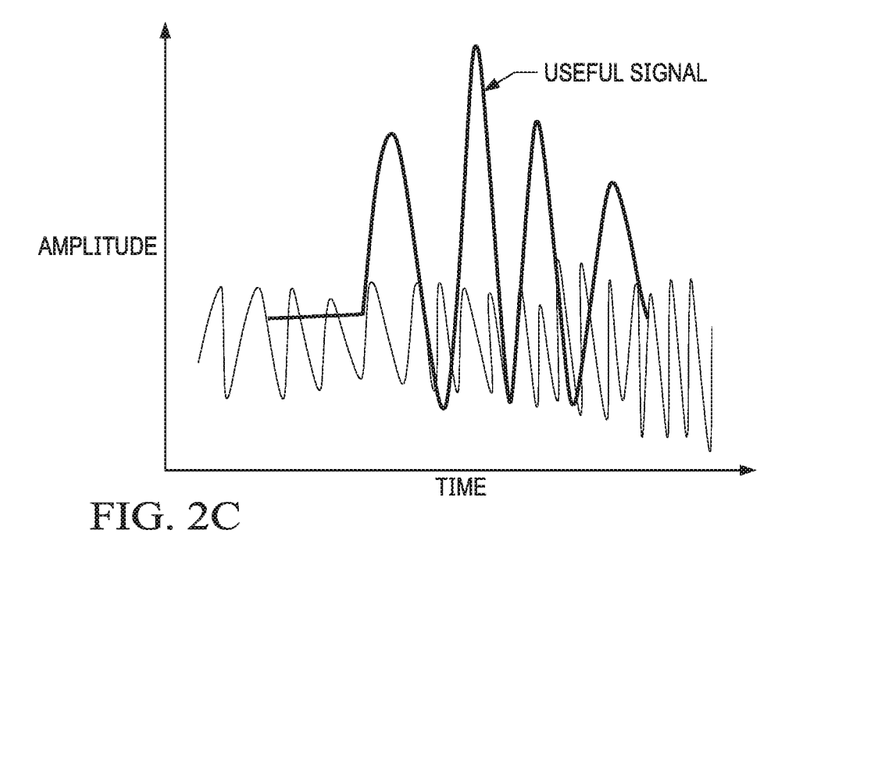
FIG. 2C is an example plot of amplitude (in arbitrary units (au)) versus time showing a useful (sensing) signal, and also the vibration from the external vibration source overlapping the useful signal caused by an external vibration source, such as the gas regulator shown in FIG. 2A or a valve.

FIG. 2A depicts a vibration source shown as a gas regulator 207 that can be in proximity to the USM 200 shown in FIG. 2B, with FIG. 2C showing a plot of amplitude versus time showing a useful (sensing) signal and also the vibration caused by the gas regulator 207 functioning as the external vibration source. The USM 200 comprises a meter body 220 including transducers $T_1$ and $T_2$, and a top-works 210 including a housing 218 on top of the meter body 220. The vibrations generated by the gas regulator 207 are shown in FIG. 2C affecting the signal sensed by the ultrasonic transducers fixed on the meter body of the USM by being within the frequency range of the useful signal. The time series signal shown in FIG. 2C and FIG. 2D can be transformed into the frequency domain using a fast Fourier transform (FFT) to obtain a signal spectrum.

Figure 2D:
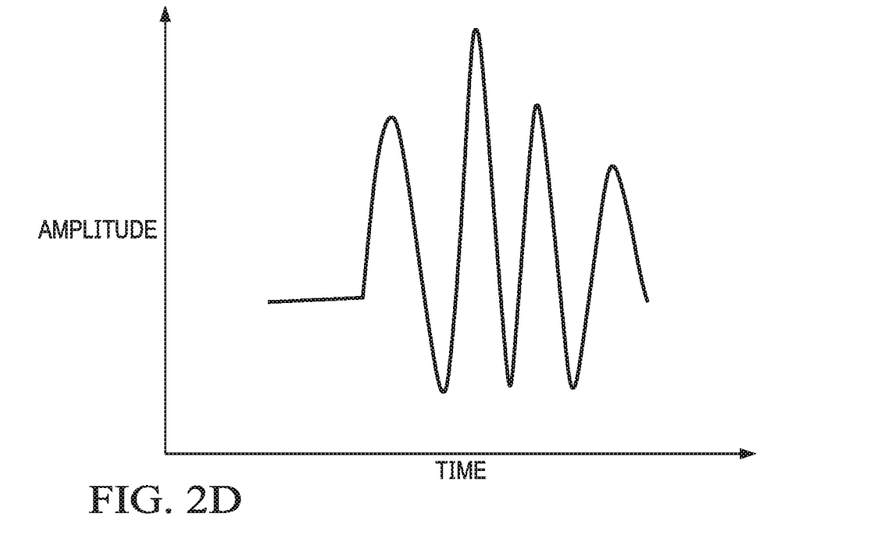
FIG. 2D shows an example plot of amplitude versus time showing only the useful signal shown in FIG. 2C, after the vibration caused by the external vibration source is removed, or after being heavily suppressed by a disclosed anti-vibration operating mode.

As used herein, the term "proximate" means a distance of no more than three times an inner diameter (D) of the pipe section upon which the USM is installed. For example, when D=2 inches, proximate corresponds to 6 inches of inlet distance to the USM. It is noted that the longer the separation distance of the USM to the vibration source, such as comprising a gas regulator or valve, the smaller the vibration effects. FIG. 2D shows an example plot of amplitude versus time showing only the useful signal shown in FIG. 2C, after the vibration caused by the external vibration source is removed or after being heavily suppressed, by a disclosed anti-vibration operating mode. As an example, the useful signal can be in the frequency range from 180 kHz to 220 kHz for piezoelectric elements of the ultrasonic transducers operating at central frequency of 200 kHz.

Disclosed USMs can thus include both an accelerometer and an acoustic sensor such as a high-frequency (HF) microphone on the PCB of the top-works, where the PCB is in tight physical contact with the meter body to receive the vibrations caused by the external vibration source that is in proximity to the USM. When the USM is installed in proximity to vibration sources such as gas regulators on the same pipe, vibrations caused by the vibration source as shown in FIG. 2C creates noise-like signals in the ultrasonic spectrum of the useful signal that travel along the pipe to USMs' meter body and thus the top-works, where the PCB including the accelerometer and/or an acoustic sensor are generally firmly affixed via a metal fixture integrated to the housing.

The ultrasonic transducers, as well as the accelerometer, can be communicating with the controller using Inter-Integrated Circuit (I²C), serial peripheral interface (SPI), or Universal Asynchronous Receiver/Transmitter (UART). The controller, such as comprising an MCU, is configured to analyze the sensing data, detect the vibration frequency spectrum and determine if the USM should be switched to anti-vibration mode or not. The disclosed anti-vibration mode is generally implemented by a firmware (FW) based-algorithm including program code configured to reduce the noise effect by using a longer measurement time and/or extra data processing task(s) that are described in more detail below.

Figure 3A:
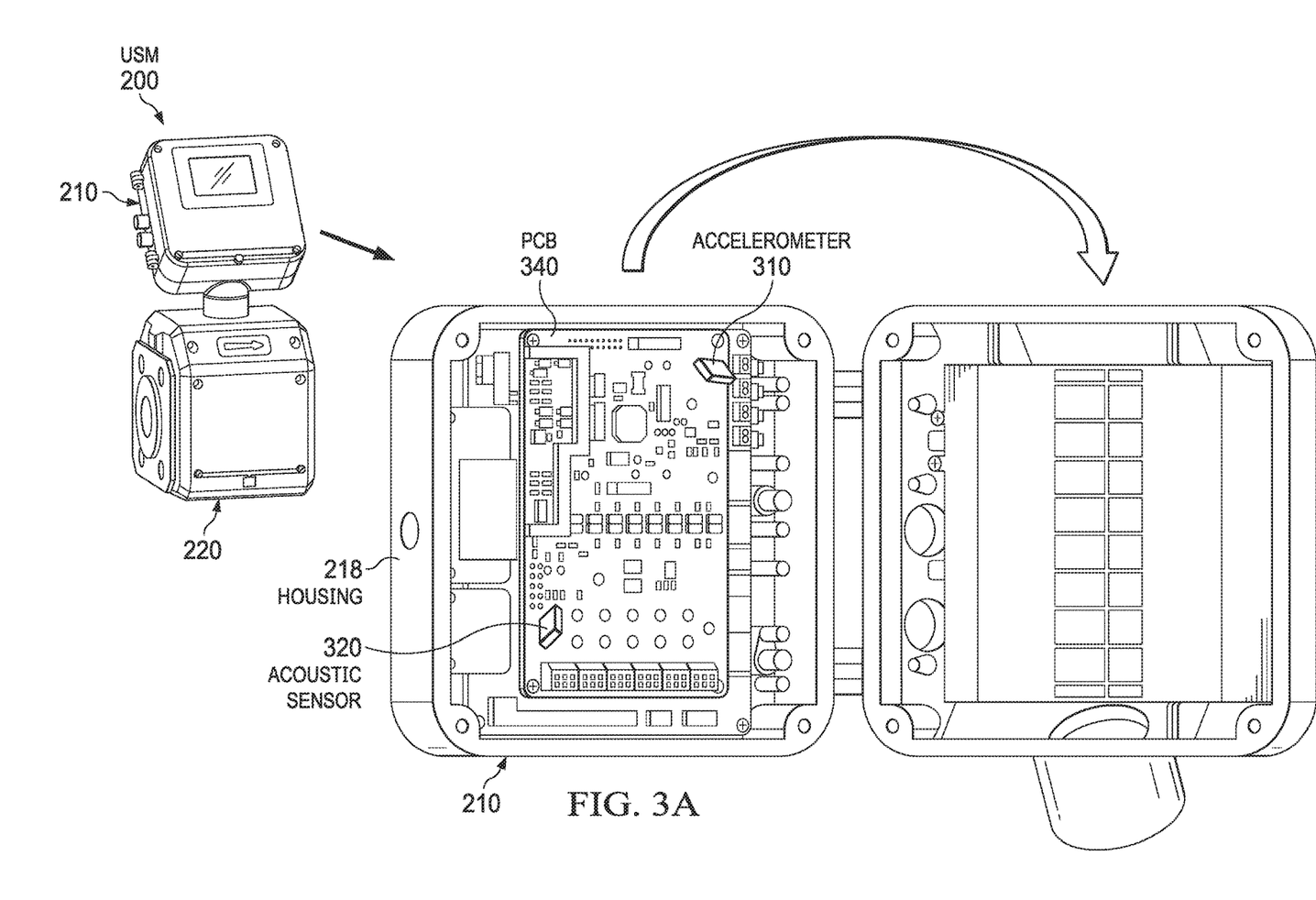
FIG. 3A shows an example USM comprising a PCB on top of a meter body, and some example components on the PCB including a disclosed accelerometer and a disclosed acoustic sensor, according to an example aspect.

FIG. 3A shows the example USM 200 shown in FIG. 2, with example components for the PCB 340 of the housing 218 shown by opening the housing 218. The components shown include an accelerometer 310 that can comprise a 3D accelerometer and an acoustic sensor 320 which can comprise a high-frequency microphone sensor. Both the accelerometer 310 and the acoustic sensor 320 are shown mounted on the PCB 340.

Figure 3B:
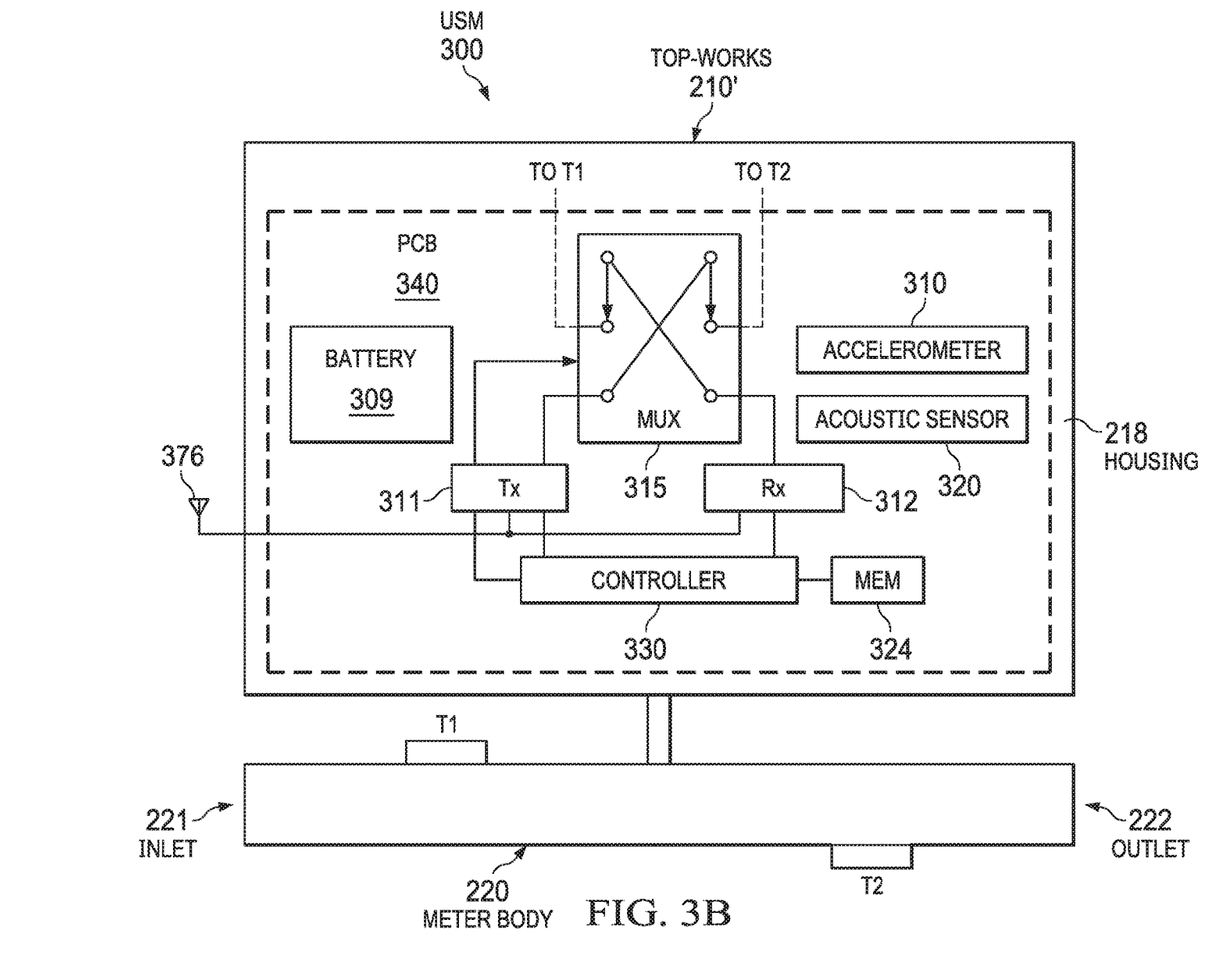
FIG. 3B an example USM with a top-works on a meter body, showing example components of the top-work's PCB.

FIG. 3B shows an example USM 300 with a top-works 210' comprising a housing 218, with the top-works 210' on a meter body 220 that as shown includes transducers $T_1$ and $T_2$ that may be behind front-cover thus not visible from the outside, showing example components of the top-work's PCB 340 beyond that shown in FIG. 3A. Again, shown are the accelerometer 310 and the acoustic sensor 320, that although not shown coupled to the controller 330, are both communicatively coupled to the controller 330. The battery 309 shown in FIG. 3B is optionally mounted on the PCB 340.

Disclosed USMs such as USM 300 are generally low-power, low-cost, and comprise smart USMs. As noted above the controller 330 can comprise an MCU, the memory 324 can comprise flash memory, and a radiofrequency (RF) communications unit is shown including a transmitter (Tx) 311 and receiver (Rx) 312 coupled to an antenna 376 that is shown outside the housing 218. The housing 218 generally comprises a metal or a metal alloy.

The ultrasonic transducers shown as $T_1$ and $T_2$ associated with the meter body 220 include piezoelectric crystals or piezoelectric ceramics that are set into vibration when a pulsed voltage signal (received from the Tx 311) is applied to their piezoelectric element, thereby generating ultrasonic waves. In operation, ultrasonic pulses are alternately transmitted enabled by the digitally controlled multiplexer (MUX) 315 controlled by the controller 330 by one of the piezoelectric elements of the ultrasonic transducer pair and are received by the other piezoelectric element of the ultrasonic transducer pair needed for the gas flow measurement.

The memory associated with controller 330 is shown as 'MEM' 324 that can store code for implementing flow measurement and for implementing disclosed anti-vibration mode operation. However, as known in the art, algorithms run by the controller 330 may be implemented by hardware and/or be implemented by software. Regarding hardware-based implementations, algorithm equations can be converted into a digital logic gate pattern, such as using VHDL (a Hardware Description Language) that can then be realized using a programmable device such as a field-programmable gate array (FPGA) or complex programmable logic device (CPLD), or a dedicated application-specific integrated circuit (ASIC) to implement the logic gate pattern. Regarding software-based implementations, code for the algorithm is generally stored in a memory such as memory 324, which can be implemented by the controller 330.

The meter body 220 includes an inlet 221 for receiving a fluid and an outlet 222 for releasing the fluid after flow measurement. Although $T_1$ and $T_2$ are shown being in a straight face-to-face transducer arrangement, as noted above the ultrasonic transducers can be configured in other arrangements such as a reflection-based V-arrangement. Moreover, as noted above, there can be more than two ultrasonic transducers.

Figure 4:
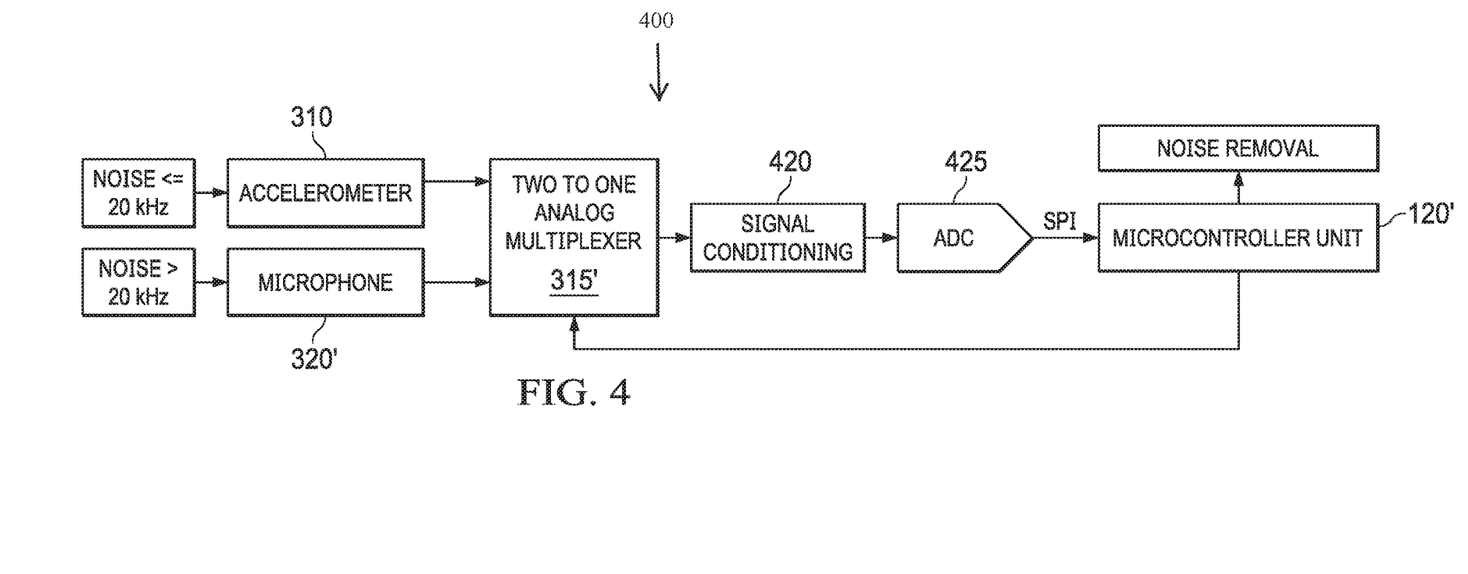
FIG. 4 depicts a sensing hardware module schematic diagram for an example vibration noise removal system, according to an example aspect.

FIG. 4 depicts a sensing hardware module schematic diagram 400 for an example noise removal system, according to an example aspect. Shown is a noise frequency less than or equal to 20 kHz being sensed by an accelerometer 310, and a noise frequency greater than or equal to 20 kHz sensed by an acoustic sensor shown as a microphone 320', which may also be ultrasound sensor. As described above, this noise can come from a gas regulator or a valve located proximate to the USM. The outputs from the accelerometer 310 and microphone 320' are shown coupled to a two-to-one digitally controlled multiplexer shown as 315', that has its output coupled to signal conditioning circuitry 420 generally comprising bandpass filtering and low noise amplification. The output of the signal conditioning circuitry 420 is coupled to a high-speed analog-to-digital converter (ADC) 425 that is shown communicating by serial peripheral interface (SPI) with a controller shown as a processing MCU 120' that implements disclosed noise removal.

Figure 5:
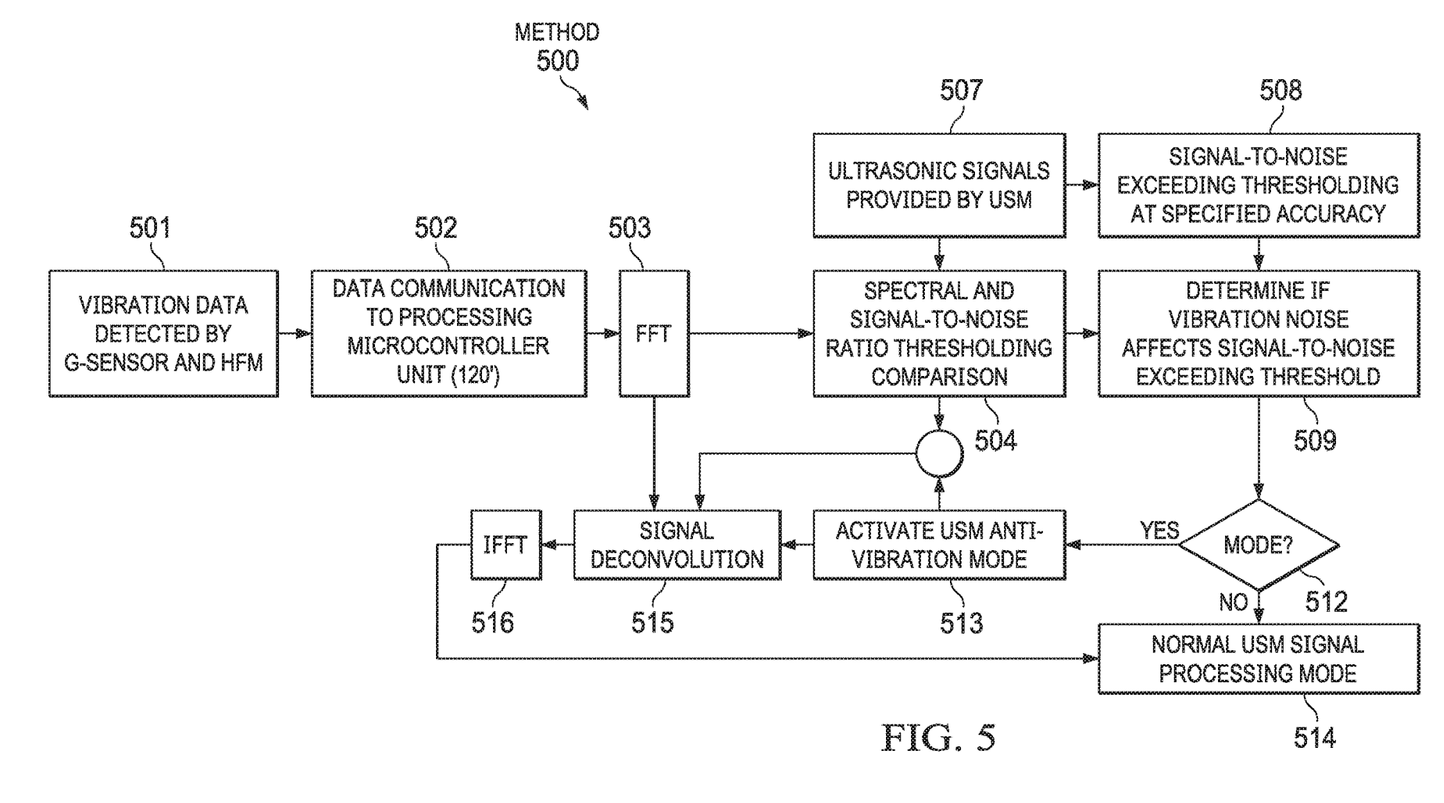
FIG. 5 depicts an example signal processing flowchart for an example method of noise detection and removal for a USM, according to an example aspect.

FIG. 5 is a signal processing flowchart for an example method 500 of noise detection and removal for a USM, according to an example aspect. Step 501 comprises the accelerometer and/or acoustic sensor detecting a vibration from a vibration source such as a gas regulator or a valve located proximate to the USM, and in response generating vibration data. Step 502 comprises communicating the vibration data to a controller shown in FIG. 4 as an MCU 120'. Although not shown, there is generally both signal conditioning and an ADC operation performed before communicating the vibration data to the MCU 120', such as shown in FIG. 4 as signal conditioning circuitry 420 for the signal conditioning, and an ADC 425 for performing the ADC function. The ADC 425 can operate at more than a 1 million samples per second (SPS) sampling rate.

Step 503 comprises the MCU 120' performing an FFT on the processed vibration data to perform the function of time-to-frequency domain conversion. As known in the art, an FFT is an algorithm that computes the discrete Fourier transform (DFT) of a sequence, or its inverse (IDFT). Fourier analysis converts a time or space signal from its original domain (here amplitude versus time data, such as shown in FIG. 2C described above) to discrete frequency domain vibration data. Step 504 comprises performing a spectral and signal-to-noise ratio (SNR) thresholding comparison of frequency domain vibration data with the known frequency range of operation for the USM, with the known frequency range data shown provided by the USM in block 507. The same known frequency range data provided by the USM block in block 507 is also provided to step 508 which comprises using the known frequency range data to generate SNR thresholding at a specified accuracy.

Data from step 504 and step 508 is provided as input data to implement step 509 that comprises determining if the vibration noise significantly affects the SNR of the USM by exceeding a threshold. Step 508 recognizes the SNR to a large extent determines accuracy for a USM, and that different applications can have different accuracy requirements and thus different thresholds for comparing the SNR. The SNR can be expressed in decibels or in a linear scale. If the SNR is determined to be too low when comparing to the threshold, then the low SNR can be caused by vibration noise which can be removed or suppressed by disclosed methods, that makes the USM's ultrasonic wave detection and thus its accuracy performance more reliable, for example when utilizing time-of-flight (ToF) detection for flow measurement.

Based on the results of step 509, the method moves to step 512 which comprises a decision step that involves deciding whether to implement a disclosed anti-vibration operating mode or not. If the results of step 509 determine that the vibration noise is affecting the SNR by exceeding the threshold, step 513 is reached which comprises implementing a disclosed anti-vibration operating mode. If the results of step 509 are that the vibration noise is determined to not affect the SNR by not exceeding the threshold, step 514 is reached which comprises the USM utilizing a normal USM signal processing mode.

If the disclosed anti-vibration operating mode (step 513) is implemented, the method moves to steps 515 and 516 which both comprise frequency domain processing. Step 515 comprises signal deconvolution utilizing the frequency domain vibration data provided by the FFT (step 503) utilizing the spectral and SNR thresholding comparison generated in step 504. The deconvolution signal output by step 515 is processed by an inverse FFT block (IFFT) 516. IFFT is known to be an inverse fast algorithm that performs an inverse (or backward) Fourier transform, which undoes the process of FFT to transform the frequency signals to a time domain series, such as shown in FIG. 2D described above. Following block 516, the method reaches step 514 which comprises as described above the USM utilizing a normal USM signal processing mode.

Disclosed aspects can be applied to generally a wide variety of USMs. For example, disclosed USMs can apply to commercial or industrial USMs that generally operate under relatively high pressure, such as above a pressure of 3 bar, or residential USMs that generally operate at a lower pressure.

While various disclosed aspects have been described above, it should be understood that they have been presented by way of example only, and not limitation. Numerous changes to the subject matter disclosed herein can be made in accordance with this Disclosure without departing from the spirit or scope of this Disclosure. In addition, while a particular feature may have been disclosed with respect to only one of several implementations, such feature may be combined with one or more other features of the other implementations as may be desired and advantageous for any given or particular application.

The invention claimed is:

1. A method, comprising:
providing an ultrasonic flowmeter (USM) including a meter body comprising a pipe section configured to flow a fluid including at least a first and a second ultrasonic transducer, and top-works including a housing and a printed circuit board (PCB) comprising electronics including a controller having associated memory coupled to the ultrasonic transducers through at least one of a transmitter and a receiver, and at least one of an accelerometer and an acoustic sensor for sensing a vibration on the pipe section for providing an output signal coupled to an input of the controller, the electronics communicatively coupled to the meter body, and the housing is mechanically coupled to the meter body by a mechanical joint;
the controller:
analyzing the output signal to identify at least one vibration frequency;
comparing the vibration frequency to a predetermined sensitive frequency range for the USM, and
when the vibration frequency is determined to be within the predetermined sensitive frequency range, implementing an anti-vibration operating mode comprising increasing a measurement time when measuring the flow of the fluid and adding additional data processing task(s), wherein the additional data processing task(s) comprises fast Fourier transform (FFT) processing followed by deconvolution. measuring the flow of the fluid and adding additional data processing task(s).

2. The method of claim 1, wherein the USM includes both the accelerometer and the acoustic sensor.

3. The method of claim 1, wherein the comparing comprises fast Fourier transform (FFT) processing.

4. The method of claim 1, wherein the anti-vibration operating mode is implemented by program code associated with a vibration reducing algorithm that is stored in the memory.

5. The method of claim 1, wherein the predetermined sensitive frequency range is determined by at least one resonant frequency of the ultrasonic transducers which is determined by at least one of a maximum phase and a minimum impedance.

6. The method of claim 1, wherein the predetermined sensitive frequency range is 80 kHz to 300 kHz.

7. The method of claim 1, wherein the fluid comprises a hydrocarbon gas or hydrogen.

8. The method of claim 1, further comprising a gas pressure regulator along another pipe section that is proximate to the pipe section.

9. The method of claim 1, wherein the accelerometer is coupled to the controller by a serial interface selected from Inter-Integrated Circuit ($I^2C$), serial peripheral interface (SPI), and Universal Asynchronous Receiver/Transmitter (UART).

10. An ultrasonic flowmeter (USM), comprising:
a meter body comprising a pipe section for flowing a fluid including at least a first and a second ultrasonic transducer,
top-works including a housing and a printed circuit board (PCB) comprising electronics including a controller having associated memory coupled to the ultrasonic transducers through at least one of a transmitter and a receiver, and at least one of an accelerometer and an acoustic sensor for sensing a vibration on the pipe section and for providing an output signal coupled to an input of the controller, the electronics communicatively coupled to the meter body, and the housing is mechanically coupled to the meter body by a mechanical joint;
the controller configured for:
analyzing the output signal to identify at least one vibration frequency;
comparing the vibration frequency to a predetermined sensitive frequency range for the USM, and
when the vibration frequency is determined to be within the predetermined frequency range, implementing an anti-vibration operating mode comprising increasing a measurement time when measuring the flow of the fluid and adding additional data processing task(s), wherein the additional data processing task(s) comprises fast Fourier transform (FFT) processing followed by deconvolution.

11. The USM of claim 10, wherein the anti-vibration operating mode is implemented by program code associated with a vibration reducing algorithm that is stored in the memory.

12. The USM of claim 10, wherein the USM includes both the accelerometer and the acoustic sensor.

13. The USM of claim 10, wherein the comparing comprises fast Fourier transform (FFT) processing.

14. The USM of claim 10, wherein the fluid comprises a hydrocarbon gas or hydrogen.

15. The USM of claim 10, wherein the predetermined sensitive frequency range is determined by at least one resonant frequency of the ultrasonic transducers which is determined by using at least one of a maximum phase and a minimum impedance.

16. The USM of claim 10, wherein the predetermined sensitive frequency range is 80 kHz to 300 kHz.

* * * * *